Aug. 21, 1951     F. L. GERIN     2,564,892
VISCOSIMETER
Filed Sept. 3, 1947
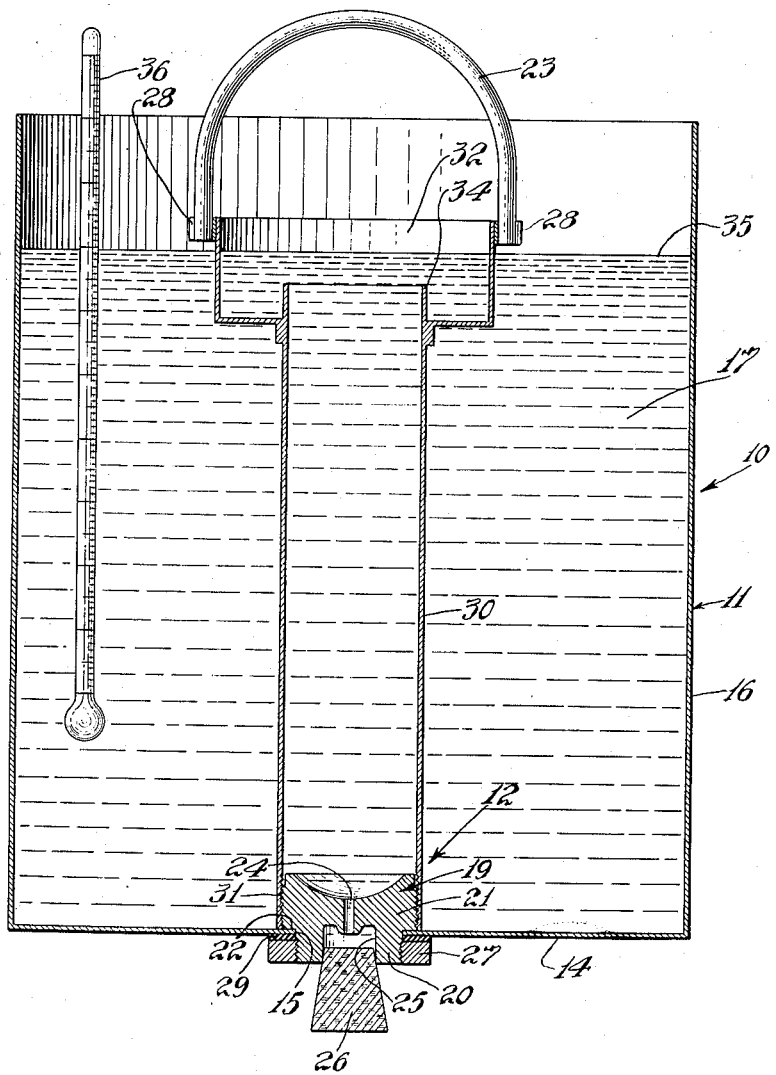
INVENTOR.
Fernand L. Gerin
BY
Ernest A. Joenen
ATTORNEY Patented Aug. 21, 1951

2,564,892

UNITED STATES PATENT OFFICE 2,564,892

VISCOSIMETER

Fernand L. Gerin, Locust, Middletown Township, Monmouth County, N. J.

Application September 3, 1947, Serial No. 771,940

2 Claims. (Cl. 73—56)

The present invention relates to an improved viscosimeter and a method of making standard viscosity determinations.

A standard method of testing the viscosity of liquids, such as petroleum products and lubricants, involves the use of apparatus known as the Saybolt viscosimeter.

This apparatus comprises a tank for receiving a bath of liquid having an opening at the bottom thereof, a vertically disposed tube permanently secured to the bottom of the tank at the opening, a standard size orifice in the tube (usually .1765 centimeter in diameter), and a closure such as a cork for the bottom of the tube.

In utilizing this apparatus for testing lubricating oil or the like, liquid is placed in the tank and is heated to standard test temperatures, for example, 100, 130 or 210° F., while heating the sample to be tested in a pan or dish to the selected standard test temperature. The test sample is then poured into the tube and the closure is removed, thereby permitting a portion of the sample to flow through the orifice. The sample is collected in a receiver, such as a flask, having a graduation mark to indicate when its contents measure 60 cubic centimeters, and the time, in seconds, required to collect such volume of the sample is observed. The viscosity of the sample is expressed in seconds at a given temperature. For example, a sample tested at 210° F. of which 60 cubic centimeters require 100 seconds to pass through the orifice, is said to have a viscosity of 100 seconds Saybolt Universal (SSU) at 210° F.

The manipulation of the foregoing described apparatus requires considerable skill and usually it takes one to three hours of time to bring the heating bath and the sample to exactly the correct temperatures. One of the difficulties is that the sample cools off in pouring it from the dish or pan in which it is heated into the tube surrounded by the bath. If there is any variation from the standard test temperature in either or both the bath or the sample, the viscosity test will result in inaccurate values. Should this occur, the entire procedure must be started all over again. It is therefore apparent that this apparatus can only be trusted in the hands of a skilled and exacting laboratory technician. An untrained person or careless technician is very likely to compromise the temperature adjustments, which results in the collection of virtually useless or misleading data.

In the operation of a Diesel power plant where large quantities of lubricating oils are utilized, it is very desirable to know the condition of the oil. This may be ascertained by testing the viscosity thereof to determine the extent of contamination by fuel. The conventional practice of Diesel power plant operators has been to run the engines without testing the lubricating oil excepting once or twice a year. Such tests are made by sending a sample to a testing laboratory because the operator lacks sufficiently trained personnel to make accurate viscosity determinations. The results of the tests usually are received after a delay of several weeks, whereby they are of relatively no significance because the condition of the oil may change in the interim.

The present invention aims to provide an improved apparatus and a method of testing the viscosity of liquids, such as lubricating oil, which enable viscosity determinations to be made accurately at frequent intervals at the power plant without the employment of skilled technicians.

Accordingly, an object of the present invention is to provide an improved apparatus for making viscosity determinations.

Another object is to enable viscosity determinations to be made at random temperatures within practical limits.

Another object is to eliminate the difficulty in independently heating two bodies of liquid to exactly the same standard temperature.

Another object is to shorten the time required to make viscosity tests.

Another object is to greatly simplify the method of conducting such tests whereby accurate and reliable results may be attained by persons not highly skilled in laboratory technique.

A further object is to provide apparatus for making viscosity determinations which yield values the same as Saybolt units within practical limits.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects and advantages are attained by providing an improved apparatus for conducting viscosity tests which comprises a receptacle having an opening in the bottom thereof, a tube disposed vertically in the receptacle, and means associated with the tube and the bottom of the receptacle for removably connecting the tube to the receptacle. In utilizing this apparatus, a quantity of the liquid to be tested is placed in the receptacle, while the tube is removed, and the tube is utilized to agitate the liquid to steady the temperature thereof. A column of liquid is segregated by connecting the tube in place so that the remainder of the liquid serves as a bath. The liquid confined by the tube is tested by withdrawing the same through the orifice according to standard test procedure.

In the drawing, the single figure is a sectional view of a viscosimeter embodying the present invention.

Referring to the drawing in detail, there is shown a viscosimeter 10 comprising in general a receptacle, such as a tank 11, and viscosity test sample retaining and outlet means 12.

The tank 11 has a bottom 14 formed with an opening 15 and has a side wall 16 which preferably is cylindrical. The tank may be formed of any suitable material such as sheet metal, preferably copper, and is adapted to contain a bath of liquid 17.

The test sample retaining and outlet means 12 include a fitting, such as an outlet head 19, having a lower threaded section 20 extending through the opening 15 of the bottom and having an upper threaded section 21 of larger diameter than the lower section to provide an annular flange or shoulder 22 resting on interior of the bottom adjacent the opening thereof. The upper section is formed with a centrally located orifice 24 of standard dimensions, for example, .1765 centimeter in diameter. The lower section is formed with a central recess or bore 25 in communication with the orifice adapted to receive a removable closure, such as a cork 26, for shutting off the flow of liquid through the orifice.

The head 19 is secured to the bottom of the tank by a screw ring 27 or the like, which is threaded on the lower section of the head to force the portion of the bottom adjacent its opening against the flange 22. Preferably, an annular gasket or sealing ring 29 is placed between the underside of the bottom and the screw ring to provide a liquid tight seal.

A viscosity sample tube 30 is vertically mounted in the tank, which, in accordance with the invention has a threaded portion 31 at the lower end thereof cooperating with the threaded upper section 21 of the head for removably connecting the tube to the head. The upper end of the tube has an enlarged cup-shaped portion 32 and an upwardly extending overflow run 34 providing a gallery for a surplus of liquid. The tube 30 is generally cylindrical and has standard Saybolt viscosimeter dimensions.

In order to facilitate handling the tube 30, particularly, while screwing it into place while heated liquid is contained in the tank 11, a handle 23 is provided at the upper end of the tube. Preferably, the handle is removably attached to the tube by inserting the depending ends thereof into spring clips 28 secured to tube at opposite sides thereof, whereby the handle may be removed after the tube is mounted in place so that it will not adversely affect the temperature of the liquid by radiating heat conducted thereto.

In utilizing the apparatus illustrated and described herein for testing the viscosity of liquids, the cork 26 is secured in the bore 25, the tube 30 is unscrewed and removed from the tank, and a quantity of the liquid to be tested is placed in the tank to the liquid level 35.

The liquid to be tested may be at a temperature between about 70° and 210° F. For example, the liquid, in the case of lubricating oil, may be withdrawn from the engine while at a temperature of about 150° F. whereby heating thereof is not required. If the liquid is at a lower temperature, and heating thereof is desired, this may be accomplished by heating the liquid in a receptacle before placing it in the tank or by heating the liquid while in the tank. In the latter instance this may be accomplished by externally applying a source of heat to the bottom and/or side wall of the tank and by a heat source at the interior of the tank, such as a steam coil, an electric heating unit or the like.

The liquid in the tank is stirred or otherwise agitated by means of the tube 30 to steady the temperature thereof and to bring the temperature of the liquid and the apparatus in equilibrium. The temperature value at which the viscosity test is about to be conducted can be selected at random and may be of any value within practical limits. The temperature of the liquid is determined by reading a thermometer 36 immersed therein.

When the temperature of the liquid has been steadied, the tube 30 is screwed in place on the upper section of the outlet head to segregate a column of liquid within a bath surrounding the tube. A portion of the column is used as a test sample. The excess of liquid in the gallery is drawn off by means of a pipette or the like, whereupon the viscosity test may be begun.

In proceeding with the test, the cork is removed and 60 cubic centimeters of the liquid is permitted to flow through the orifice into a receptacle 37 having a graduation to indicate when its liquid content has reached 60 cubic centimeters. The time elapsed during the flow of this quantity of liquid is observed in seconds to determine the viscosity of the liquid in units equivalent to standard Saybolt viscosity measurement units. Since a relatively large volume of liquid surrounds the column of liquid, the temperature of which is in equilibrium with the temperature of the column, the temperature of the column is maintained substantially constant while the test is being made.

Preferably in the case of lubricating oil, two or more viscosity determinations of a given liquid are made following the foregoing procedure at different temperatures between about 70° and 210°. For example, a test is made at 147° F. and a second test is made at 122° F. The viscosity values determined may be plotted as points on standard American Society for Testing Materials viscosity-temperature charts which are designed for recording Saybolt readings. A straight line is drawn through these points. If the viscosity of the oil has not changed, then this line also should extend through the points representing the Saybolt viscosity specification of the oil in its original condition. This procedure enables a comparison to be made between used lubricating oil and the original oil to determine whether or not the viscosity has changed. If a material change in viscosity is noted, the operator is warned that the lubricating oil must be replaced or reconditioned.

The foregoing viscosity test can be made in such a simple manner, that the oil may be tested frequently. Instead of checking the viscosity once or twice a year as heretofore has been the practice, the viscosity may be determined daily or even more frequently without any inconvenience on the part of the operator. Since the results of these determinations are acquired promptly, damage to machinery lubricated by oil of improper composition can be readily averted.

From the foregoing description, it will be seen that the present invention provides an improved apparatus for making viscosity determinations in a more simple and practical manner. The apparatus is simple in construction and is economical to manufacture. The apparatus can be readily manipulated by persons not highly skilled in laboratory procedures. The manner of making viscosity determinations eliminates the tedious procedure of attempting to independently heat a sample and a bath to the same temperature, whereby the method can be performed quickly and accurately.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described. and all statements of the scope of the invention which, as a matter of language, might be said to fall therebetween.

I claim:

1. A viscosimeter comprising a receptacle for the liquid to be tested having an opening in the bottom thereof, an outlet head for said opening secured to said receptacle, said outlet head having a section disposed within said receptacle and being formed with a metering orifice, a tube having an open lower end and having an overflow channel encircling its upper end, and means for removably connecting the lower end of said tube to said outlet head section, whereby on applying said tube to said head, test liquid is entrapped in said tube and excess liquid may be removed from said tube to establish a specimen of predetermined quantity in said tube.

2. In a viscosimeter, the combination of an outlet head having a tube connecting section at its upper end and being formed with a metering orifice, means on said head for securing the same in an opening of a receptacle for the liquid to be tested, a tube having an open lower end and having an overflow channel encircling its upper end, and cooperating means on said outlet head section and on the lower end of said tube for removably connecting said tube to said outlet head, whereby on applying said tube to said head test liquid is entrapped in said tube and excess liquid may be removed from said tube to establish a specimen of predetermined quantity in said tube.

FERNAND L. GERIN.

REFERENCES CITED

The following references are of record in the file of this patent:

UNITED STATES PATENTS

| Number | Name | Date |
|---|---|---|
| 1,132,621 | Saybolt | Mar. 23, 1915 |